United States Patent
Eisl et al.

(10) Patent No.: US 8,787,390 B2
(45) Date of Patent: Jul. 22, 2014

(54) REACHABILITY MAINTENANCE OF A MOVING NETWORK BASED ON TEMPORARY NAME IDENTIFIERS

(75) Inventors: Jochen Eisl, Garching (DE); Eleanor Hepworth, Southampton (GB); Louise Krug, Ipswich (GB)

(73) Assignees: Siemens Aktiengesellschaft, Munich (DE); British Telecommunications Public Limited Company, London (GB)

( * ) Notice: Subject to any disclaimer, the term of this patent is extended or adjusted under 35 U.S.C. 154(b) by 2084 days.

(21) Appl. No.: 10/571,672

(22) PCT Filed: Aug. 18, 2004

(86) PCT No.: PCT/EP2004/051826
§ 371 (c)(1), (2), (4) Date: Jun. 26, 2008

(87) PCT Pub. No.: WO2005/027458
PCT Pub. Date: Mar. 24, 2005

(65) Prior Publication Data
US 2012/0008567 A1    Jan. 12, 2012

(30) Foreign Application Priority Data
Sep. 12, 2003    (EP) .................... 03255733

(51) Int. Cl.
*H04W 4/00* (2009.01)
*H04W 84/00* (2009.01)
*H04W 8/26* (2009.01)
*H04W 8/28* (2009.01)

(52) U.S. Cl.
CPC .............. *H04W 84/005* (2013.01); *H04W 8/26* (2013.01); *H04W 8/28* (2013.01)
USPC ......................................................... 370/400

(58) Field of Classification Search
CPC ........ H04W 84/005; H04W 8/26; H04W 8/28
See application file for complete search history.

(56) References Cited

U.S. PATENT DOCUMENTS

| | | |
|---|---|---|
| 6,587,874 B1 * | 7/2003 | Golla et al. ................... 709/220 |
| 2003/0086390 A1 | 5/2003 | Eschbach et al. |
| 2003/0095523 A1 | 5/2003 | Korus et al. |
| 2004/0073786 A1 * | 4/2004 | O'Neill et al. ................ 713/155 |

(Continued)

FOREIGN PATENT DOCUMENTS

| | | |
|---|---|---|
| EP | 1 263 185 A2 | 12/2002 |
| EP | 1 289 197 A1 | 3/2003 |
| WO | WO 02/47415 A1 | 6/2002 |

OTHER PUBLICATIONS

P. Srisuresh et al., "DNS Extensions to Network Address Translators (DNS ALG)"; Network Working Group Request for Comments RFC 2694; Sep. 1999; 28 pp.

(Continued)

*Primary Examiner* — John Blanton
(74) *Attorney, Agent, or Firm* — Staas & Halsey LLP

(57) ABSTRACT

A reachability service is provided to connect portable nodes of a moving network to at least one external, fixed network via at least one mobile router. Temporary name identifiers are allocated to the portable nodes and mapped to current reachable addresses of the portable nodes by at least one proxy name server.

11 Claims, 7 Drawing Sheets

AR Access Router
BR Border Router
CN Correspondent Node
PN Portable Node
MR Mobile Router
BS Base Station

(56) References Cited

U.S. PATENT DOCUMENTS

| | | | |
|---|---|---|---|
| 2004/0139170 A1* | 7/2004 | Shen et al. | 709/218 |
| 2004/0179536 A1* | 9/2004 | Thubert et al. | 370/395.52 |
| 2004/0190534 A1* | 9/2004 | Adrangi et al. | 370/400 |
| 2004/0235449 A1* | 11/2004 | Noel, Jr. | 455/405 |

OTHER PUBLICATIONS

International Search Report for International Application No. PCT/EP2004/051826; mailed Dec. 6, 2004.

\* cited by examiner

REACHABILITY MAINTENANCE OF A MOVING NETWORK BASED ON TEMPORARY NAME IDENTIFIERS

CROSS REFERENCE TO RELATED APPLICATIONS

This application is based on and hereby claims priority to European Patent Application No. 03255733 filed on Sep. 12, 2003, the contents of which are hereby incorporated by reference.

BACKGROUND

In the course of the accelerated and ubiquitous use of network based services throughout all areas of everyday life, the availability of such services while riding on public transport vehicles has become increasingly important for the users. Hence, the transport companies in industrial countries make efforts to provide the technical basis therefore, i.e. to develop and establish adequate moving network solutions for commercial usage. Recently, it has proved a main focus of these developments to provide for a reliable connection between the moving network and fixed networks external from the traffic means.

If a moving network changes its point of attachment to an external network like the Internet, specific measures have to be taken for nodes attached to it. If no action is taken, the nodes within the moving network will lose connectivity.

This situation is either described by mobile nodes that independently move into similar directions with similar speed or a group of nodes that travel as a single unit. The significant attributes that constitute such a moving network can be described by the common movement behavior of the individual nodes within a reference system and the relative adjacency of the individual nodes throughout the considered time interval.

SUMMARY

An important embodiment is a managed vehicular network, where a network is located inside a vehicle and provides access to traveling customers, e.g. in a train, "Managed" in this context refers to the circumstance that network infrastructure in a public passenger transportation vehicle is owned and operated by administrative organizations that identify a value chain for offering electronic communication, information and entertainment services to its customers.

A possible network topology for such a network with connectivity to external network(s) is illustrated in FIG. 1. Several portable nodes PN1 ... PN3 authenticate with a vehicular network VN. There are several potential reasons why a mobile node wants to get access through the vehicular network instead of having a direct connection with the ground network. A mobile router MR, which represents the gateway node, maintains connectivity to the ground via one or more radio access networks. The moving network may be connected to external networks through more than one MR, but in the following description only a single MR is assumed for the reason of simplicity. While the network is on move, the mobile router MR may have to re-establish connection with new candidate access router and even new candidate access networks. Some of the portable nodes may establish communication with correspondent nodes outside the moving network and especially want to maintain continuous connectivity and reachability with a home network. Then, a new connection from a correspondent node to a portable node needs to be routed properly to the current location of the moving network. Possibly location updating is necessary for a considerable number of mobile nodes, dependent on the individual requirement of each portable node to maintain reachability.

Another possible realization of such a moving network is a personal area network (PAN), with a number of portable nodes forming a spontaneous collaborative ad hoc network, where some of these nodes may act as gateway nodes to external networks.

Mechanisms to re-establish connection to external networks can be imagined of as having two stages. The first stage—which is called "connectivity"—enables the nodes within the moving network to reach out to an external network to initiate communications. The second stage—which is called "reachability"—is to enable external nodes to initiate communications with nodes within the moving network.

A method is described below for solving the problem of node reachability for nodes in moving networks by allocating temporary host names to the nodes attached to these moving networks.

Hence, it is a basic feature to include models, like for example NAT (Network Address Translation) based addressing models, that cannot be supported with existing approaches to reachability. This is done in such a way that, should the moving network roam between networks running different networking protocols (such as IPv4 and IPv6), reachability can still be maintained.

In this way, the method described below reduces communication inefficiencies. A possible message flow for reachability support is shown in FIG. 3.

In the case of a static access network, one option to support reachability is provided through the use of a naming service. Network entities (nodes and users) have names to identify themselves. Communication with these entities is then preceded by a stage in which the routable address associated with the name is discovered. The DNS is the most commonly used system for name to address mapping. In this system, a name which is assumed never or rarely to change, is mapped to an IP address which may occasionally change.

Also SIP (session initiation protocol) for enabling call control in IP based multimedia sessions can be considered as a naming system. Parties in a SIP session are addressed using SIP URIs. A SIP server may relocate a session request, if the called party redirects incoming calls to a different SIP party. This is similar to the DNS concept, but SIP does not resolve names to addresses for any SIP clients.

Different methods which could be considered to handle reachability for single mobile devices are:

1) Direct updating of the naming-address mapping—for example, the dynamic DNS solution: When the IP address of a mobile node changes, the DNS system maps the name to the new address. Although dynamic DNS has not been proposed as a solution for moving networks, it is easy to extend the concept to this case.
2) Creating a mapping between the address that is registered in the naming system, and the new address used by the node. The mapping is held by an agent which intercepts packets intended for the mobile terminal and tunnels them to the new address. In this situation the name to address mapping keeps unchanged. This is the basis behind Mobile IP based solutions. A number of MIP based solutions nave been proposed for moving networks.

The actual details of the solution depend upon the method that is used to address the moving network and the nodes within that network. We will use the following definitions:

MR=Mobile Router, the device that is actually moving around and connecting the moving network to external networks.

PN=Portable node, a node that is connected to external networks through the mobile router. There may be many PNs that may connect with one MR CN=Correspondent Node, a node within the Internet that communicates with the PN CoA=Care of Address, an address allocated by a visited network to a node that joins it.

MIP=Mobile IP. This is a method of ensuring that portable nodes remain reachable, by allowing them to associate a CoA with their well-known (e.g., DNS registered) home address. Basic MIP assumes that the network is fixed and only the end terminal moves.

GN=Ground Network—a Ground Network delivers packets between the moving network and an external IP/Internet network. It provides wireless connectivity to the MR.

NAT=Network Address Translation—a mechanism to translate between IP addresses, which can be routed in external IP networks, i.e. the Internet and a private representation of IP addresses, which can be used within a local network (sub-)domain.

In the following it is explained, for the different addressing models, how dynamic DNS and MIP solutions could sometimes be used to solve the reachability problem.

Address Allocated by the MR Home Network

This is the approach currently being pursued within the IETF NEMO WG (Network Mobility Working Group). The mobile router obtains a routable address, its CoA, from the ground network using standard mechanisms. The mobile router is associated with a home network, which is not mobile. Within this home network is a mobile IP agent that ensures that messages addressed to routes through the mobile router are tunneled to the current, globally routable, CoA of the mobile router. A subnet (or other group) of addresses is allocated to the moving network by the home network of the mobile router. These addresses are then allocated to PNs that attach to the mobile router. This ensures that the PNs are able to initiate communications to the Internet.

For obtaining a MIP solution featuring reachability, it is assumed that the PN is also MIP enabled. The PN registers the address received from the mobile router with its home agent. The address received from the mobile router never changes whilst the PN is attached to the same moving network, therefore reachability of the PN is not an issue once this initial binding update to the home agent has been carried out.

A similar approach to maintain reachability can be provided using dynamic DNS, where the PN updates its DNS server with the IP address received from the MR while the wireless point of attachment changes. This solution has a more efficient routing than the MIP based solution, but it is still not very efficient as all traffic to the PN is still directed through, and tunneled out of, the MR home network.

The drawback of both of the above solutions is that traffic is routed indirectly to the moving network via a tunnel between the PN's home network or the mobile router's home network and the mobile router itself. In the former case, an additional tunnel is required between the PN's home agent and the PN, leading to a double tunnel with a high communications overhead. This configuration is illustrated in FIG. 2.

Addresses Allocated by the Visited Network

In this situation, instead of obtaining a simple CoA from the visited network, the mobile router obtains a subnet (or some other group) of addresses from the visited network. The MR then allocates these addresses to PNs. This ensures that the PNs are able to initiate communications to the Internet. As the MR changes visited networks, e.g. the moving network hands-over between two different network domains, the IP addresses allocated to the PN must be changed.

For a MIP based solution including reachability in this situation, it is assumed that the PN is also M1P enabled. The PN registers the address received from the mobile router with its home agent. For a dynamic DNS solution to reachability, the PN updates its DNS Server with the address received from the MR while moving network hand-over occurs.

In both cases, the main disadvantage of this approach, from the point of view of reachability, is that signaling bursts, between PNs and PN MIP home agents or PN DNS server, are generated every time the network moves to update the IP addressing information due to the fact that each PN has to individually send mobility update notifications.

MR MIP Foreign Agent Solution to Addressing

In this situation, the mobile router allows the PN to keep its home address. The MR keeps per-host entries for each registered PN. The MR acts as a MIP Foreign Agent, thus it tells the PN what the MR's current network address is, this is the CoA that the PN should register with the PN home agent to achieve reachability.

This solution requires that the PN has a MIP protocol stack running in order to correctly interpret the concept of the two addresses, namely the home address and the CoA.

The disadvantages of this approach, from the point of view of reachability, are the signaling bursts between PNs and PN MIP home agents that are generated every time the network moves. Further the solution is inefficient because of the use of indirect routing and tunneling from the home agent.

NAT Based Addressing

Another method to manage the mobility of networks is for the MR to be NAT enabled. The MR allocates private addresses to the PNs.

The NAT may be stateless, i.e. addressing configuration is based on mechanisms like link detection and router advertisements. In this case, the MR obtains a set of addresses from the ground network and provides a 1:1 mapping between these addresses and the private addresses used. This addressing model has benefits over the option above where the addresses from the visited network are allocated directly to the PNs, because the mobility events are hidden from the PNs.

If the NAT is stateful, i.e. there is some mechanisms like DHCP (Dynamic Host Configuration Protocol), the MR obtains only one address (its CoA) from the ground network, and manages the necessary address translation. This approach is useful as currently ground networks only allocate single addresses to nodes.

This addressing model is perhaps the most important as it would be possible to be implemented with existing technology. Unlike the other options, the PN is unaware of the specifics of the ground network—thus for example an IPv4 terminal will not be aware that the mobility supporting ground network is actually IPv6. This is likely to be an important issue as current devices are all IPv4, but future mobile networks are likely to be the one of the first networks to operate using IPv6.

Neither the dynamic DNS nor the MIP based solutions for reachability work in this situation, as the PNs do not know their correct routable address, and so can not correctly update either system. Registration of the allocated, private, IP address with either DNS or a MIP home agent would prevent the maintenance of reachability. It may be possible to devise solutions to overcome these problems, based on Application Layer Gateways (ALQ), which provide translation function for address related information at application layer. But any such solution will be fraught with security problems. Part of a solution is provided by RFC2694, DNS extensions to NAT. In this situation, the private address of the PN is registered with a name server function that is located in the private network. When a DNS request is received by the private network, the DNS reply (which contains the private address) is intercepted by a special application level gateway (DNS-ALG)for manipulating DNS messages. This ALG (application level gateway) requests that the NAT function establishes a temporary binding between the requested private host address and a public address. The ALG can then replace the private address with the returned public address. Temporary state for the address mapping is maintained, giving the CN some time to establish a connection to the PN after the name resolving request has been answered. If no connection is established, the state will time out and the public address is returned to the NAT address pool for future use.

A system is described below that enhances name services with the usage of temporary names in order to efficiently maintain reachability for portable nodes that are attached to moving networks. The details of the solution depend on the above address assignment schemes in place, which is also true for state of the art approaches, namely the MIP and Dynamic DNS solutions described above. However this solution is also applicable for some NAT addressing solutions where the DNS and MIP solutions do not apply.

Included is a suggestion for allocating temporary names and reachability support for portable nodes attached to moving networks for the following addressing situations:
Address allocated by the MR home network
Address allocated by the visited network
Statically configured stateless NAT (network address translation)
Dynamically configured stateless NAT
State-full NAT

BRIEF DESCRIPTION OF THE DRAWINGS

These and other aspects and advantages will become more apparent and more readily appreciated from the following description of exemplary embodiments, taken in conjunction with the accompanying drawings of which.

DETAILED DESCRIPTION OF EXEMPLARY EMBODIMENT

Figure 1:
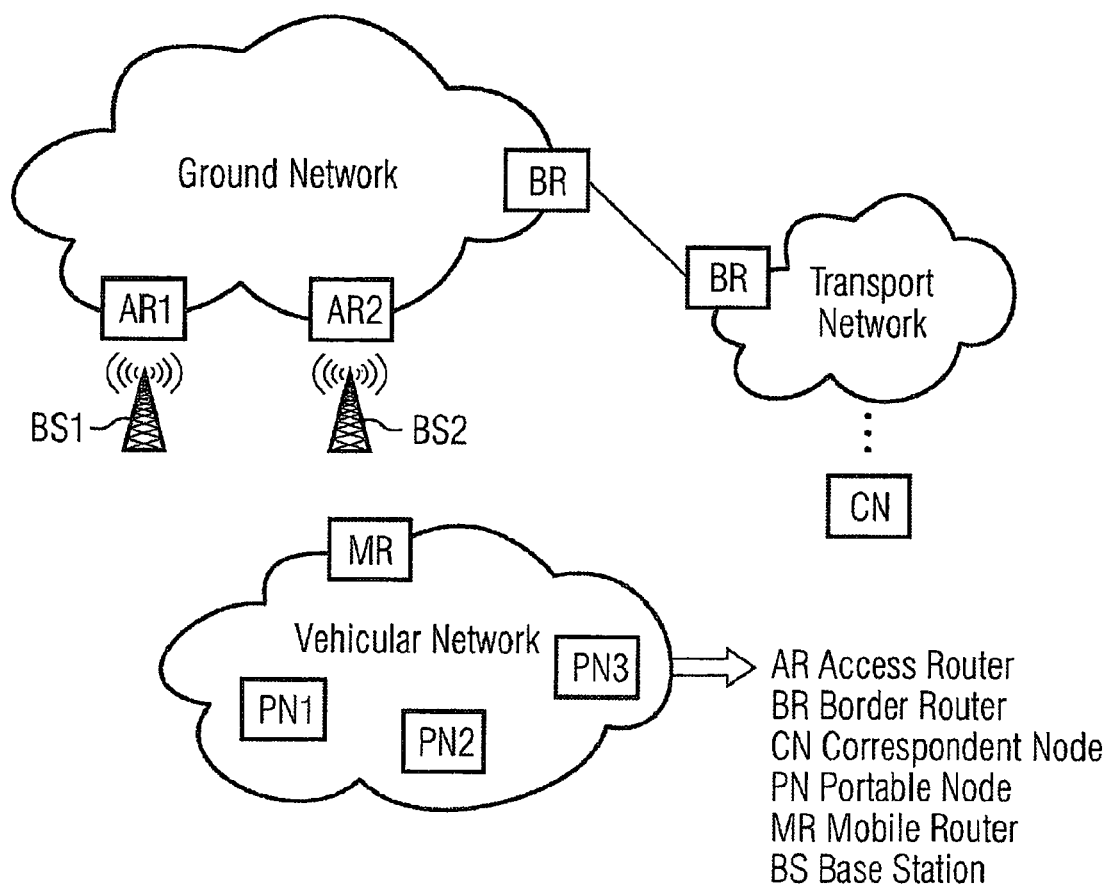
FIG. 1 is a schematic diagram of a known moving network configuration.
Figure 2:
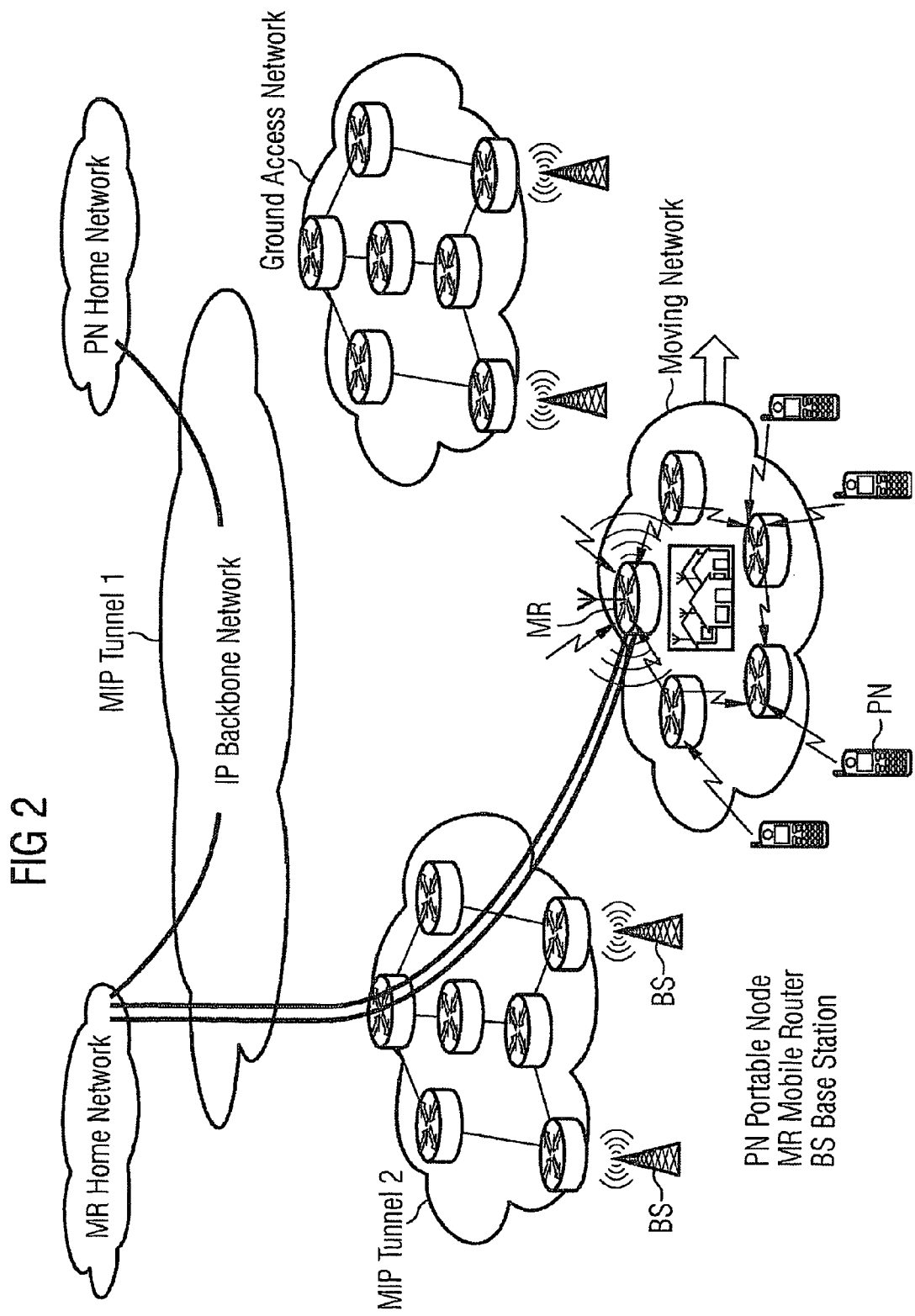
FIG. 2 is schematic diagram of a moving network configuration wherein traffic is indirectly routed.

Reference will now be made in detail to the exemplary embodiments, examples of which are illustrated in the accompanying drawings, wherein like reference numerals refer to like elements throughout.

Figure 3:
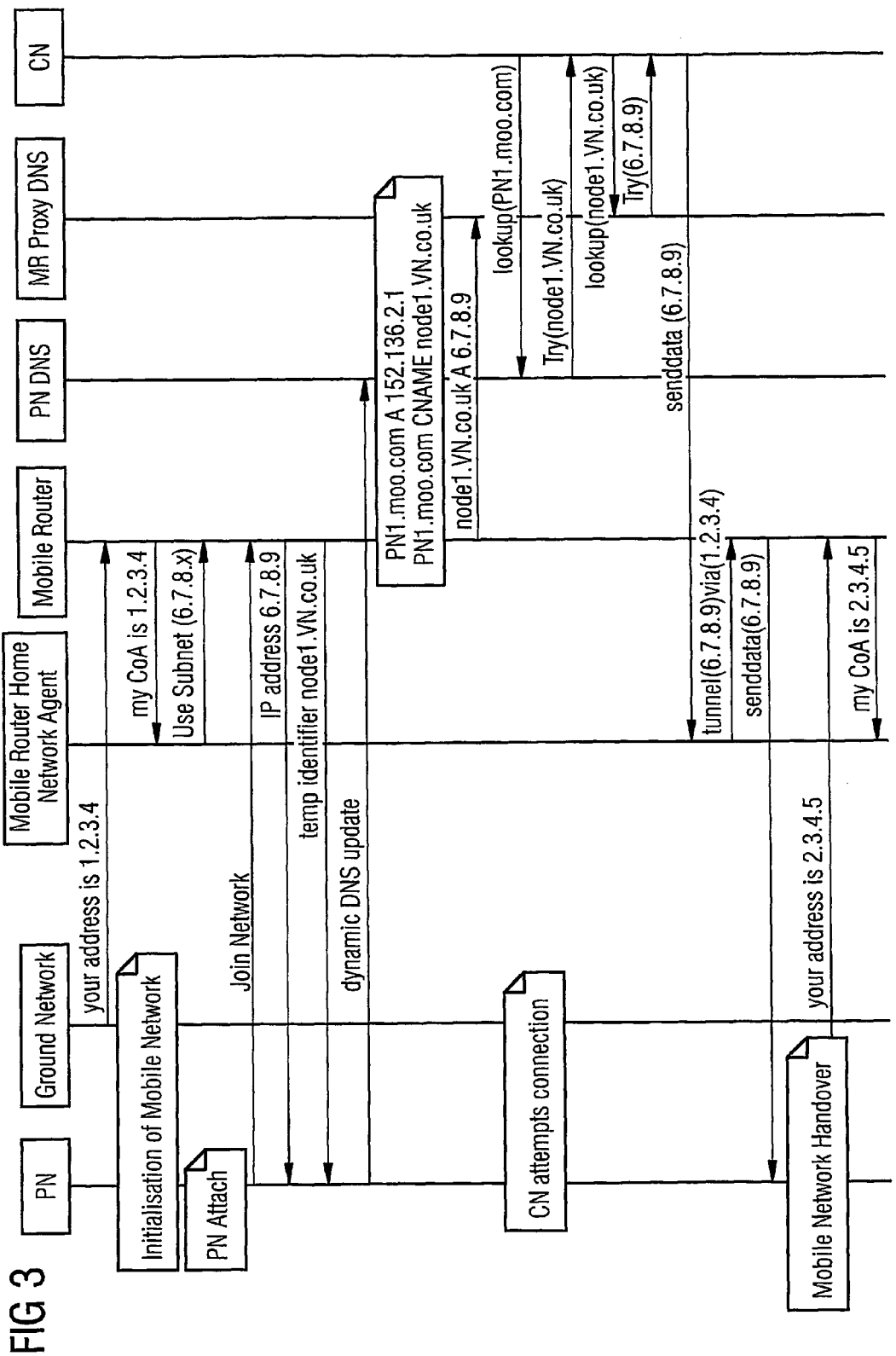
FIG. 3 is an exemplary message flow diagram for reachability support according to a first aspect.

Common to all situations is the fact that the PN may obtain a temporary name for use whilst attached to the moving network. This could easily be envisaged as part of a commonly executed user authentication and authorization process, where a user attempts being connected to a public access network. In the specific situation, the portable node physically attaches to the moving network and may request support for reachability with external networks. Then, independent of the actual addressing model used, the PN receives an IP address from the MR, e.g. through dynamic configuration with DHCP. As part of a new DHCP option, it also receives a temporary name identifier—suitable for use (e.g. as a DNS "CNAME" identity for DNS based naming service). In this example it uses the DNS UPDATE procedure to map its standard name to the new CNAME in its home DNS server. The mobile router then needs to update a proxy DNS server, which is located in a service domain within the fixed network infrastructure, with the new name address record. Further, the mobile router needs to manage the temporary name-to-address configurations on behalf of all the registered portable nodes. The precise details of this will depend upon the addressing model used to support the moving network. The DNS is used as the primary name server example simply because it is the most commonly name resolving system deployed in the Internet. However, it also highlights some technical challenging issues in the case of state-full NAT, because it supports a range of methods for name resolution.
Address Allocated by the MR Home Network In this case the mobile router allocates a PN an address as obtained from the MR home network. To use this name for reachability, two events need to happen:
The MR registers the PN's temporary name-address mapping with one or more proxy name server(s)
The PN ensures that its name server in the home network domain can find the proxy server, either by explicitly registering the address of the proxy name server with its name server, or, in a system such as DNS, by mapping its temporary new name to its well-known name.
The Process Is Illustrated in FIG. 3.

A CN can then contact the PN using the PN permanent name and the normal process for name to address resolution. When the network moves, only the mapping between the MR and its home agent needs to be updated, i.e. no messages towards proxy name servers need to be sent for this event. However, this approach still suffers from tunneling inefficiencies.
Address Allocated by the Visited Network In this case the PN obtains a topologically correct address from the ground network (GN). The GN may allocate a set of addresses to the Mobile Router (MR), and an address out of this set can be allocated to a PN. (Alternatively the GN may allocate an individual address directly to the PN—the MR just relays the corresponding message to the PN).

Figure 4:
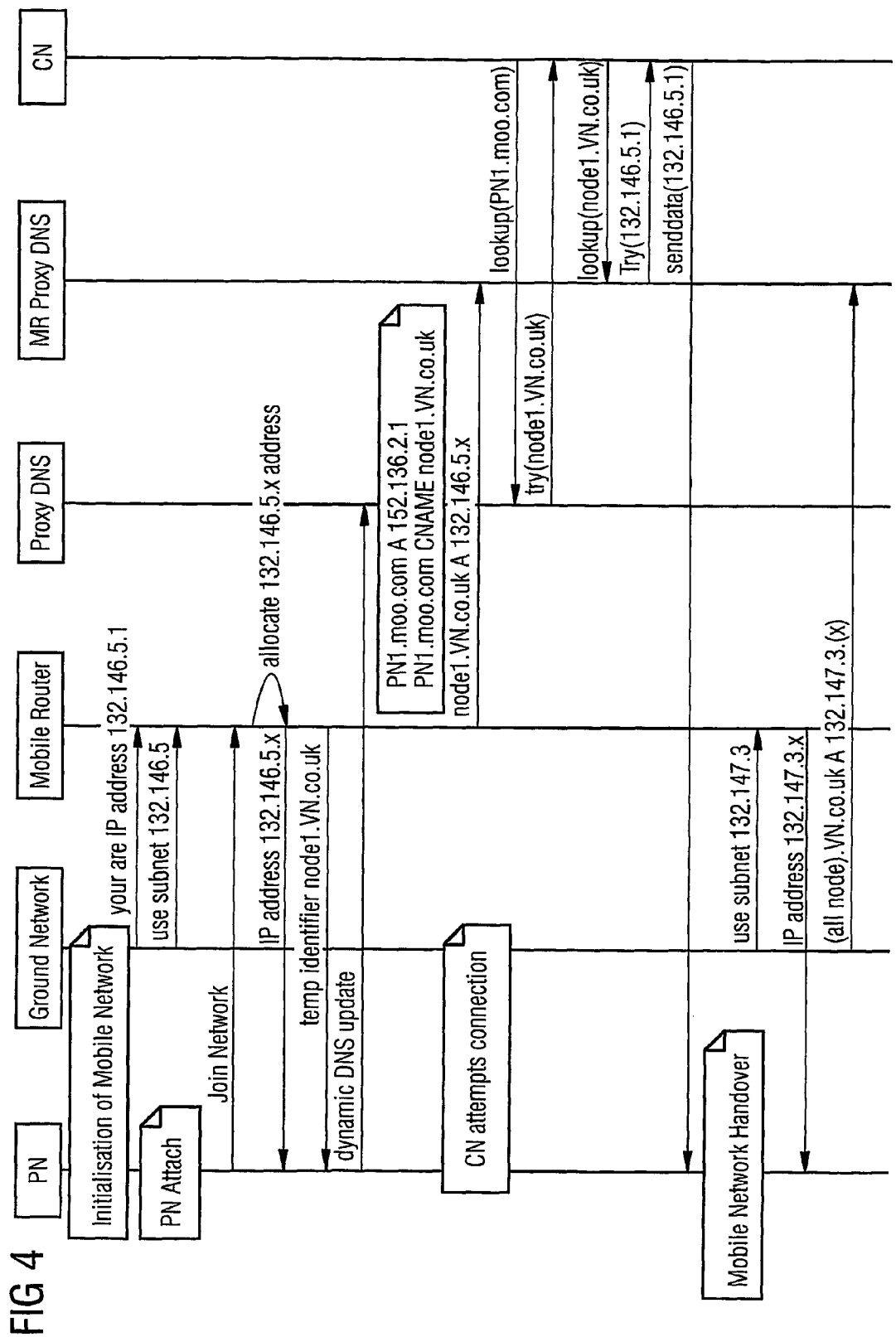
FIG. 4 is an exemplary message flow diagram for reachability support according to a second aspect.

An exemplary message flow for reachability support is illustrated in FIG. 4.

As before, the PN obtains its IP configuration and a temporary name. To use this name for reachability, two events need to happen:
The MR registers the PN's temporary name-address mapping with one or more proxy name server(s)
The PN ensures that the name server in the home network domain can find the proxy server, either by explicitly registering the address of the proxy name server with its name server in the home network domain, or, in a system such as DNS, by mapping its temporary new name to its well-known name.
A CN can then contact the PN using the PN permanent name and the normal process for name to address resolution.

The specific advantages can be seen when the network moves, as each and every PN does not need to signal its name server. Instead, a single message is sent directly by the MR to the proxy name server(s). In case several proxy name servers are in use the MR needs to maintain a binding between PNs and associated proxy name servers.

Reachability Support when Addresses are Managed Using Stateless NAT

Figure 5:
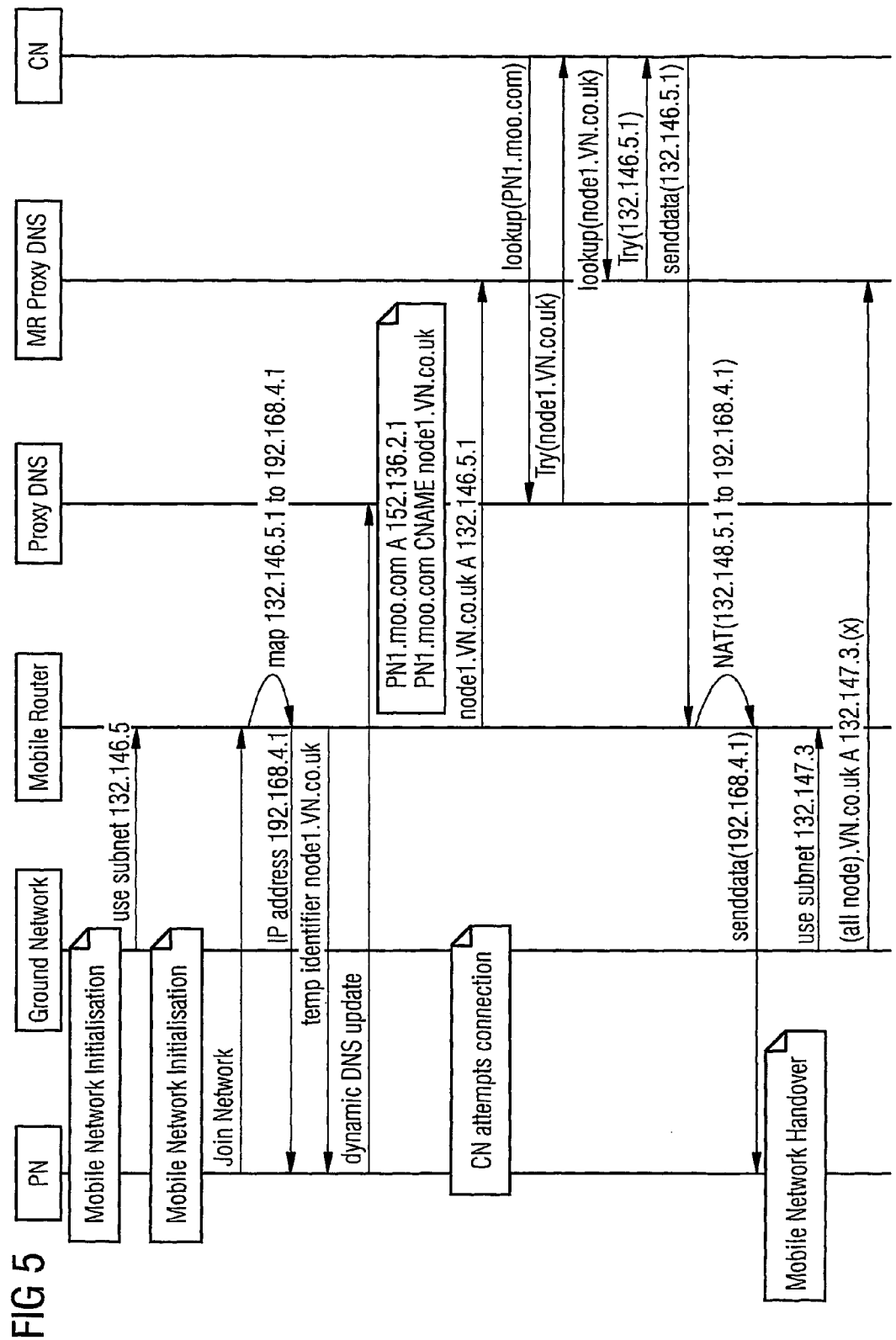
FIG. 5 shows an exemplary message flow diagram for reachability support according to a third aspect.

The process is illustrated in FIG. 5. In this addressing model, the mobile router obtains a subnet of routable addresses from the visited network. It associates one node with one address from this subnet pool but actually allocates the node a private address. This approach minimizes the amount of re-configuration that the portable node needs to do each time the moving network suffers a change of address.

Network address translation (NAT) is necessary in the mobile router for all IP datagrams that pass the network border of the moving network. Reachability support works the same way as previously described, with the PN updating its name server in the home network domain and the MR updating one or more proxy name server. This approach minimizes the signaling overhead on the wireless connection between the mobile router and the fixed networks by reducing signaling bursts caused by a mobility event. It also minimizes the signaling overhead by reducing the number of DNS queries transmitted across the wireless interface. This approach also guarantees reachability, despite the fact that the portable node is unaware of its true IP address.

Reachability Support for Addresses Allocated by State-full NAT

In this addressing model, the mobile router obtains only one or few (a limited set of) public addresses from the fixed network. The MR then allocates an address from a set of private addresses to each portable node. NAT is then used to ensure that connectivity is achieved. This NAT can include specific TCP/UDP port numbers with a specific private address or, if a limited set of public addresses has been obtained, a dynamic (as needed) one-to-one mapping between public and private addresses may be used. This provides the NAT managed connectivity that enables the PN to update its name server with its temporary name identifier as before.

However, the MR is no longer able to update the MR proxy name server(s) with a temporary name-to-routable address mapping on behalf of the PN, as no such simple mapping exists. For example a PN just is allocated a private IP address, when attaching to the moving network as it wants to use local services only. However a CN may want to establish a connection with this PN, i.e. the name of the PN needs to be resolved to a public IP address, which has not been allocated so far. In the case of a DNS and a NAT system based on single public address, the DNS system can not return a TCP or UDP port number to a CN so the MR will never be able to identify to which PN an incoming communications is intended. Where the routable address is set dynamically on demand, the proxy name server(s) can not know what dynamic association to make (as the MR may be using some addresses for outbound, connectivity purposes). The solutions to these situations require even more novel treatment in the structure of the proxy name servers.

Direct application of a solution based on temporary binding (like described in RFC2964 also to the moving network scenario also would fail because the assumption is that the name server is within the private network, so that the ALG can intercept the messages from the server before exiting the private network. In the moving network case however, this would mean that the name server has a changing IP address, as well as its moving network, and so can not be part of the name system.

Figure 6:
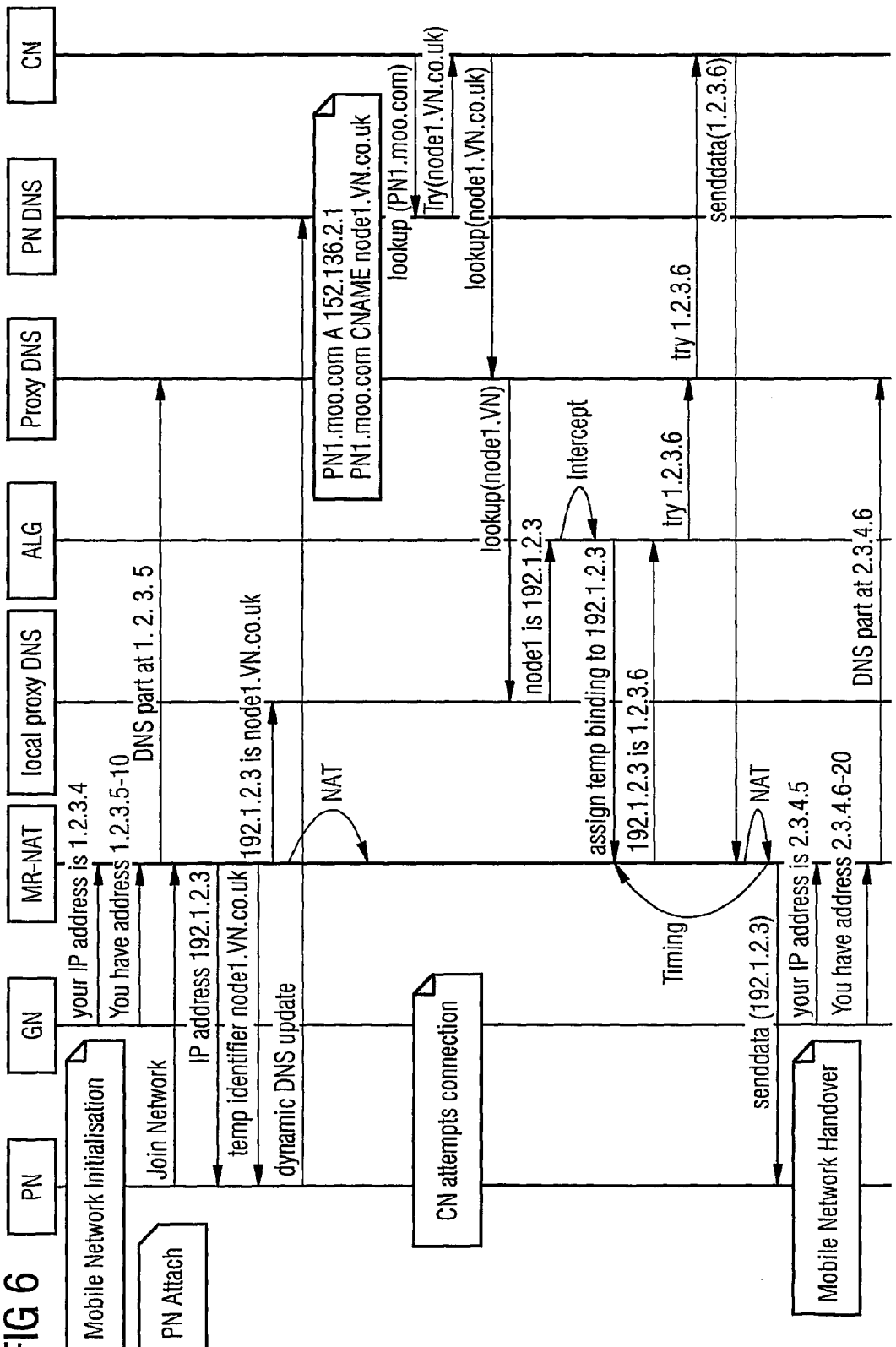
FIG. 6 shows an exemplary message flow diagram for reachability support according to a fourth aspect.

A solution of this problem is illustrated in FIG. 6. This figure shows a scenario which requires that a part of the proxy name server (its entrance) is held static within the fixed network, whilst the majority of the name server functionality is held within the moving network. The proxy server entrance receives name resolving requests from external nodes, and returns adequate replies. Name resolving itself is processed within the moving network.

The second situation was when only one routable IP address is associated with a potentially large number of portable nodes. To provide connectivity between the PN and external networks, e.g. the Internet, the mobile router then provides NAT functionality. Here the mapping of one public address to many private addresses is possible by including additional information such as a UDP or TCP port number into the translation process. However, such port information is not a common part of the more significant Internet naming system—DNS. This problem is more complex than the previous case, as the DNS system can only return the single, same address for every CN query, so a different mechanism is needed to enable the MR NAT to map incoming connections to PNs.

Because the DNS system allows for recursive DNS queries, this problem is not solvable in the general case, but only when non-recursive are made. For these kinds of queries the original name resolving requestor, i.e. the CN can be identified at the name server that finally handles the request. The solution described here is based on the assumption that the DNS functionality is split between an entrance within the fixed network, and a processing element in close association with the NAT and MR.

Figure 7:
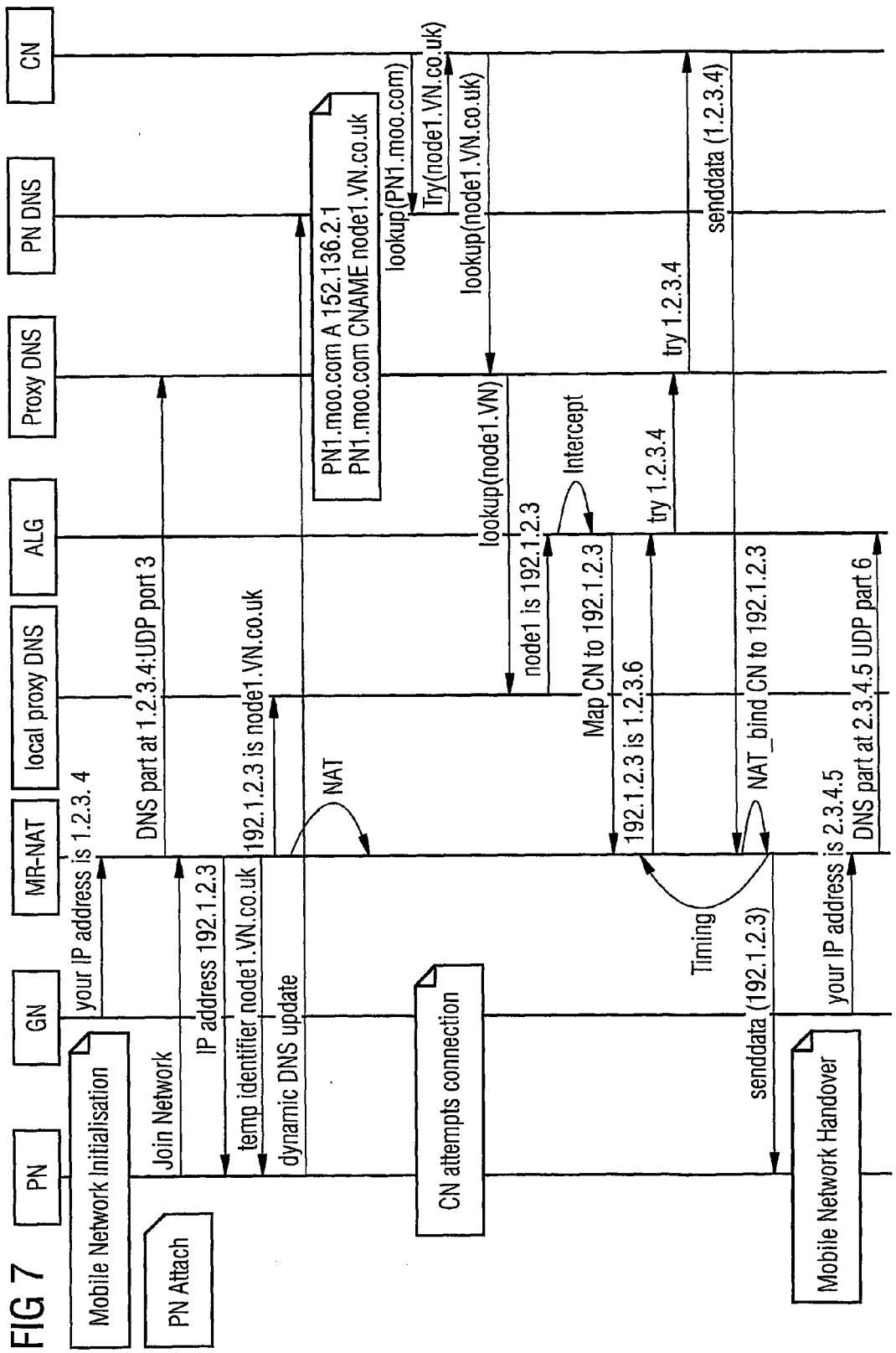
FIG. 7 shows an exemplary message flow diagram for reachability support according to a fifth aspect.

An exemplary message flow for non-recursive DNS queries is illustrated in FIG. 7. In this case, the application level gateway handling DNS (DNS_ALG system) remembers the IP address of the CN that made the DNS query and the requested PN name. This binding information is then queried when a connection request by CN enters the MR, to enable the NAT to identify the like PN. The private address can be derived from the temporary name given to the PN. Again this solution requires two name server components: a proxy name server located in the fixed network and a local name server co-located with the NAT device, more specifically a network address port translator because it includes TCP/UDP port information to map between many private and one public IP address.

The method supports reachability of portable nodes in moving networks over a broader range of addressing models than current solutions. It can be used as a replacement for Mobile IP (MIP) or dynamic DNS, as well as being suitable for reachability for different addressing solution, including NAT based addressing. Additional binding information in the network address translator enables to clearly resolve complex binding requests.

When used with network address translation the solution leads to more efficient network usage. Direct routing to the portable node is achieved and IP in IP tunnels are avoided.

When used with network address translation, some forms of topological correct addressing, and MR home network address allocation, the solution avoids signaling bursts from PNS to reachability agents in the home network domain over the mobile router-visited network link. Since this is normally a bottleneck for a wireless link, this signaling reduction is very important.

There is no requirement for a portable node to support additional MIP software and have a MIP home agent. The portable node knows, by definition, that it is portable, i.e. it is capable to connect to a network outside the home network domain and obtain a temporary address and potentially a temporary name. It does not need to know that it is mobile, or part of a moving network, although it is assumed that some means to maintain connectivity for an existing session is required—session management protocols such as SIP, or mobility aware transport protocols such as DCCP could be assumed.

The solution is IP version agnostic, portable nodes with IPv4 or IPv6 protocol stack may be supported with reachability service based on temporary names.

Group name registration carried out by a mobile router in behalf of several portable nodes attached to the moving network can significantly reduce the amount of registration information to be sent over a radio link. However group name registration is only possible in scenarios where a group of portable nodes registers temporary names more or less simultaneously at the same home network domain.

The invention is not restricted to the above described specific aspects and embodiments but can also be carried out in numerous modifications and combinations thereof.

A description has been provided with particular reference to exemplary embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A method of operating a mobile vehicular network for providing a reachability service to connect portable nodes of the mobile vehicular network to at least one external fixed network via at least one mobile router, comprising:
    registering a group of temporary name identifiers on behalf of several portable nodes attached to the mobile vehicular network by the mobile router;
    allocating the temporary name identifiers to the portable nodes;
    mapping the temporary name identifiers to current reachable addresses of the portable nodes by at least one proxy name server;
    updating the at least one proxy name server by mobile routers of the mobile vehicular network cooperatively sending registration and mobility update messages with recent address information of the portable nodes in response to any address change to ensure that sufficient information to resolve naming requests is available in the at least one proxy name server; and
    providing, by the mobile router, the at least one proxy name server with an address to forward a name resolving request to a local name server in case the proxy name server is unable to resolve a naming request.

2. A method according to claim 1, wherein said allocating of the temporary name identifiers is performed during authentication of the portable nodes upon entry to the mobile vehicular network.

3. A method according to claim 1, wherein said allocating of the temporary name identifiers is carried out anytime after completion of the authentication, in response to dedicated naming requests.

4. A method according to claim 1, wherein said mapping supports a direct address translation scheme where each private address of a portable node has a corresponding public address, or address aggregation, and at least one public address is mapped to a plurality of private addresses.

5. A method according to claim 4, further comprising address aggregation in the address translation scheme by forwarding the name resolving request from the at least one proxy name server to a local name server of the mobile vehicular network that is associated with a domain name of a temporary name registered for a portable node.

6. A method according to claim 5, further comprising:
    identifying by the local name server of the mobile vehicular network whether the name resolving request is recursive or non-recursive; and
    responding by the local name server of the mobile vehicular network to a recursive request by sending an error message.

7. A method according to claim 6, further comprising in support of a dynamic model of address translation, obtaining at a portable node a public address based on an external name resolving request from a correspondent node located outside the mobile vehicular network, by forwarding the name resolving request from the at least one proxy name server to the local name server of the mobile vehicular network that is associated with the domain name of the temporary name registered for the portable node.

8. A method according to claim 7, wherein said allocating of the temporary name identifiers uses a new Dynamic Host Configuration Protocol option.

9. A method for operating a mobile network for providing a reachability service to connect portable nodes of the mobile network to at least one external fixed network via a mobile router configuration, comprising:
    allocating temporary name identifiers to the portable nodes;
    mapping the temporary name identifiers to current reachable addresses of the portable nodes by at least one proxy name server;
    updating, using multiple mobile routers, the at least one proxy server using registration and mobility update data including recent address information associated with the portable nodes in response to any address change, and
    wherein at least one mobile router is movable into a range of the at least one external fixed network.

10. A mobile vehicular network configuration having access to at least one external network, comprising:
    a plurality of portable nodes connected to the mobile vehicular network via a plurality of mobile routers, the plurality of mobile routers:
        providing access to the at least one external network by the portable nodes,
        registering a group of temporary name identifiers on behalf of the plurality of portable nodes, and
        allocating the temporary name identifiers to the portable nodes; and
    a proxy name server mapping the temporary name identifiers to current reachable addresses of the portable nodes,
    wherein the plurality of mobile routers update the at least one proxy name server via registration and mobility update messages which include recent address information of the portable nodes in response to any address change to ensure that sufficient information to resolve naming requests is available to the at least one proxy name server, and
    the at least one proxy server is provided with an address to forward a name resolving request to a local name server in case the proxy name server is unable to resolve a naming request.

11. A mobile network configuration according to claim 10, wherein the local name server of the mobile network is associated with a domain name of a temporary name registered for a portable node.

* * * * *

UNITED STATES PATENT AND TRADEMARK OFFICE
CERTIFICATE OF CORRECTION

PATENT NO. : 8,787,390 B2  Page 1 of 1
APPLICATION NO. : 10/571672
DATED : July 22, 2014
INVENTOR(S) : Jochen Eisl et al.

It is certified that error appears in the above-identified patent and that said Letters Patent is hereby corrected as shown below:

In the Claims

Column 9, Line 53, In Claim 2, Delete "claim 1 ," and insert -- claim 1, --, therefor.

Column 9, Line 57, In Claim 3, Delete "claim 1 ," and insert -- claim 1, --, therefor.

Column 9, Line 61, In Claim 4, Delete "claim 1 ," and insert -- claim 1, --, therefor.

Signed and Sealed this
First Day of December, 2015

Michelle K. Lee
*Director of the United States Patent and Trademark Office*